(12) United States Patent
Helot et al.

(10) Patent No.: US 11,267,390 B2
(45) Date of Patent: Mar. 8, 2022

(54) LAMP ARRANGEMENT FOR A MOTOR VEHICLE, AND MOTOR VEHICLE

(71) Applicant: AUDI AG, Ingolstadt (DE)

(72) Inventors: Jacques Helot, Ingolstadt (DE); Ulrich Müller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/085,150

(22) Filed: Oct. 30, 2020

(65) Prior Publication Data

US 2021/0188153 A1 Jun. 24, 2021

(30) Foreign Application Priority Data

Dec. 20, 2019 (DE) .................... 102019135408.0

(51) Int. Cl.
| | |
|---|---|
| *B60Q 1/00* | (2006.01) |
| *F21S 41/151* | (2018.01) |
| *B60Q 1/26* | (2006.01) |
| *F21S 43/50* | (2018.01) |
| *F21S 41/50* | (2018.01) |
| *F21S 43/14* | (2018.01) |
| *F21S 43/15* | (2018.01) |
| *F21Y 109/00* | (2016.01) |
| *F21Y 115/10* | (2016.01) |

(52) U.S. Cl.
CPC ......... *B60Q 1/0023* (2013.01); *B60Q 1/2696* (2013.01); *F21S 41/151* (2018.01); *F21S 41/50* (2018.01); *F21S 43/14* (2018.01); *F21S 43/15* (2018.01); *F21S 43/50* (2018.01); *F21Y 2109/00* (2016.08); *F21Y 2115/10* (2016.08)

(58) Field of Classification Search
CPC .. B60Q 1/0023; B60Q 1/2696; F21Y 2109/00
See application file for complete search history.

(56) References Cited

U.S. PATENT DOCUMENTS

| | | | |
|---|---|---|---|
| 9,057,931 B1 | 6/2015 | Baldwin | |
| 10,647,092 B2 * | 5/2020 | Bauerle | B32B 17/10036 |
| 11,027,528 B2 * | 6/2021 | Laluet | G02B 27/0101 |
| 2005/0238857 A1 * | 10/2005 | Day | B32B 17/10174 |
| | | | 428/209 |
| 2007/0017642 A1 | 1/2007 | Bauer et al. | |

(Continued)

FOREIGN PATENT DOCUMENTS

| | | |
|---|---|---|
| DE | 102008042012 A1 | 3/2010 |
| DE | 102012221074 A1 | 5/2014 |
| DE | 102015205332 A1 | 10/2015 |

(Continued)

OTHER PUBLICATIONS

Machine translation of Haffmans, DE 102008042012 A1, published Mar. 18, 2010 (Year: 2010).*

(Continued)

*Primary Examiner* — William N Harris
(74) *Attorney, Agent, or Firm* — Maier & Maier, PLLC

(57) ABSTRACT

A lamp arrangement for a motor vehicle, including a lamp with a transparent carrier for at least one light source, in particular a micro-LED, and a control device. The lamp arrangement has at least one environmental sensor which is arranged behind the carrier and which acquires sensor data through the carrier.

20 Claims, 3 Drawing Sheets

(56) References Cited

U.S. PATENT DOCUMENTS

2015/0353003 A1* 12/2015 Salter .................... F21S 41/16
362/510
2019/0193376 A1* 6/2019 Bauerle .................. H01L 33/62

FOREIGN PATENT DOCUMENTS

| DE | 102016007591 A1 | 2/2017 |
| DE | 102019000619 A1 | 6/2019 |

OTHER PUBLICATIONS

German Search Report dated Jul. 9, 2020 in corresponding German Application No. 102019135408.0; 12 pages; Machine translation attached.

* cited by examiner

LAMP ARRANGEMENT FOR A MOTOR VEHICLE, AND MOTOR VEHICLE

FIELD

The invention relates to a lamp arrangement for a motor vehicle, comprising a lamp with a transparent carrier for at least one light source, in particular a micro-LED, and a control device. The invention furthermore relates to a motor vehicle.

BACKGROUND

Modern motor vehicles use increasingly complex vehicle systems, in particular driver assistance systems, which are increasingly dependent on information from the environment of the motor vehicle. Consequently, different environmental sensors are often installed in modern motor vehicles, which collect sensor data which, as information describing the environment in the corresponding detection area, can form input data for vehicle systems of the motor vehicle. Typical examples of environmental sensors include ultrasonic sensors, lidar sensors, radar sensors, and cameras.

Particularly in the case of cameras as environmental sensors, these are often difficult to integrate into the overall appearance of the motor vehicle, often seeming like foreign objects. This can also apply to other sensors, for example radar sensors. For example, cameras that supply image data for vehicle systems as sensor data are nowadays attached to different positions in motor vehicles, for example behind the primer edge of the windshield and/or on or in the radiator grille. The installation space required is also problematic when installing environmental sensors. Finally, the installation of environmental sensors, in particular cameras, often leads to additional transitions between components, which means that gaps are created through which moisture and dirt can penetrate or in which these can become lodged.

DE 10 2019 000 619 A1 relates to an arrangement for positioning a camera in a housing of an external vehicle unit. To reduce the assembly effort, the vehicle exterior unit is designed as a tail light or as a headlight or as a license plate light, wherein the camera is positioned in a light source-free region of the housing. An enlarged module is therefore proposed there, in which, however, the camera is still visible and thus possibly forms a foreign object.

DE 10 2016 007 591 A1 discloses a method for synchronizing a headlight of a vehicle with a camera. Therein, the headlight illuminates an environment of the vehicle with light pulses and the camera takes pictures of the environment. Individual pixels of the headlight designed as an LED matrix headlight can be modulated offset to one another, wherein the modulations are mapped in an image recorded by the camera as a beat pattern, from which a time offset for synchronizing the camera and LED matrix headlights is determined.

Various novel approaches have since been proposed in the field of the lighting of motor vehicles. One of these approaches uses so-called micro-LEDs, which can also be referred to as μ-LEDs. Micro-LEDs are much smaller versions of the inorganic light-emitting diodes that are already widely used. Micro-LEDs can be attached to a base substrate, for example, using coating techniques, wherein a complete integration of the micro-LEDs in a carrier is also conceivable. It is sufficient therein to provide the micro-LEDs only sparsely on the substrate or in the carrier, which means that only a small proportion, for example less than 10% or even less than 1%, of the extended surface of the carrier is covered with micro-LEDs as light sources.

Micro-LEDs integrated into a corresponding carrier or other types of light sources integrated into a corresponding carrier of moderate thickness, for example made of glass or transparent plastic, can be used to create a lamp for a motor vehicle, which is thin and compact but nevertheless highly luminous. Such lamps can for example be applied to the outside of body parts or the like.

The problem underlying the invention is to specify a possibility of attaching environmental sensors in a motor vehicle in a manner that is as invisible as possible.

SUMMARY

To solve this problem, it is provided according to the invention in a lamp arrangement of the type mentioned above that the lamp arrangement has at least one environmental sensor which is arranged behind the carrier and acquires sensor data through the carrier.

According to the invention, use is made of the fact that lamps with a transparent carrier, for example made of glass or plastic, can also be used on the exterior of a motor vehicle, for example on the front, side or back of the motor vehicle. The lamps comprise a transparent, in particular flat, carrier and are provided with light sources, in particular micro-LEDs. These light sources emit the light. For example, the lamp can be a direction indicator, a daytime running light, a tail light or the like. However, it is also conceivable that the lamp is a headlight.

One or multiple environmental sensors, in particular at least one camera, are now arranged behind the transparent carrier of the lamp. In this way, the environmental sensor, in particular the camera, is provided in a hidden way, but is still functional. This is not only beneficial for the external design of the motor vehicle, but also protects the environmental sensor and avoids gaps and the like along the outer surface of the motor vehicle.

The environmental sensor is particularly preferably a camera, but other types of environment sensors are also fundamentally conceivable, for example radar and/or lidar sensors.

It should be noted at this point that micro-LEDs are particularly preferred due to their subtle appearance in or on the transparent carrier, as they only have an extremely small impact on the detection range of optical environmental sensors, in particular cameras. Thus, the present invention provides in particular to use the large free space between the individual light sources and the fact that the carrier is transparently designed, in order to use the carrier as a protective and cover element for the environmental sensor. In principle, however, the invention can also be applied to other concepts with a transparent carrier, for example for light guides integrated into a transparent substrate and the like. The carrier is therefore fundamentally of a flat design, which means that it has a particularly significantly smaller thickness than width and height. In particular, the area is less than 30%, preferably less than 10%, particularly preferred less than 1%, occupied by the particularly non-transparent light sources.

In a particularly preferred refinement of the present invention, it is provided that the control device is designed for the alternating operation of the environmental sensor, particularly formed as a camera, and the light sources such that the sensor data acquisition, in particular the image data acquisition by the camera, occurs during light emission pauses of the light sources. In other words, an interleaved operation of light sources and environmental sensor can be provided, such that either the light sources or the environmental sensor are operated, thus largely avoiding possible interference, such that in particular a pause can also be provided between the operating phases of the lamp and the environmental sensor. Specifically, it can be provided that the control device is designed to operate the light sources with a frequency in the range from 25 to 150 Hz, in particular 70 to 150 Hz and/or the operating frequency of the light sources and the environmental sensor are identical. In a specific example, it can therefore be provided that when the lamp emits at a frequency of approximately 100 Hz, sensor data, in particular image data, are recorded in the intervening time periods, also at a frequency of 100 Hz.

It is also particularly advantageous within the scope of the present invention if a layer which can be controlled by the control device to switch between a transparent and a non-transparent state is arranged between the carrier and the environmental sensor, in particular at the environmental sensor side of the carrier, and the control device is designed for switching the switchable layer into a transparent state during the detection operation of the environmental sensor. A switchable layer can therefore be additionally provided on the carrier, preferably on the environmental sensor side, which is switched to a transparent state whenever the environmental sensor is operated, in particular when image data are to be recorded with a camera. Corresponding switchable layers are already known in principle in the prior art. In particular, a liquid crystal technology can be used within the scope of the present invention, while it is furthermore also conceivable to use electrochromic materials. Electrochromism refers to the ability of molecules and crystals to change their optical properties by means of an external electric field or current flow. An electrochromic material which can be used by way of example is tungsten oxide ($WO_3$). Therein, it is particularly expedient if the switchable layer has a color in the non-transparent state which corresponds in particular to an exterior color of the motor vehicle. In that case, an excellent camouflage, so to speak, of the environment sensor behind the light is provided, wherein the lamp also blends in perfectly with the overall appearance of the motor vehicle. In this context, it is also preferred within the scope of the invention if the control device is designed to switch the switchable layer to the non-transparent state at the time when neither the environmental sensor nor the lamp are operated. In summary, a design is conceivable in which the transparent carrier is provided with a switchable layer in such a manner that the environmental sensors, in particular cameras, are not visible when they are not in operation and the lamps themselves appear in the color of the motor vehicle when they are switched off. In addition, when the layer is not in operation and is opaque, for example when the motor vehicle is parked, a protection of the at least one environmental sensor from sunlight is provided.

The control of the switchable layer therein can be easily adapted to the alternating operation of the lamp and the environmental sensor, such that, for example, the same operating frequency is used for the switchable layer as is for the environmental sensor, for example 100 Hz. In this case, as well as in general, the design is such that the switchable layer is switched to be non-transparent, that is to say opaque, when (only) the light sources are operated.

The lamp arrangement can preferably have multiple environmental sensors arranged behind the carrier. Depending on the space available, it is also possible to install multiple environmental sensors, in particular multiple cameras, behind the transparent carrier. It can be provided in a particularly advantageous design that the multiple environmental sensors are arranged such that the detection area of at least one of the environmental sensors comprises a partial area that is covered by a light source for at least one of the other environmental sensors. Even if, when using micro-LEDs for example, only extremely small areas obscure the view of the environment sensor, in particular the camera, it can be expedient to avoid such "blind spots" by providing at least one additional environmental sensor which is positioned such that it captures the obscured portion of the detection area of at least one other environmental sensor. This guarantees a complete coverage of the environment.

In addition to the lamp arrangement, the present invention also relates to a motor vehicle which has at least one lamp arrangement according to the invention. As already mentioned, various types of uses for the lamp on the exterior of the motor vehicle are conceivable, for example as a direction indicator, daytime running light, position light, tail light and even headlight. All statements regarding the lamp arrangement according to the invention can be analogously transferred to the motor vehicle according to the invention, and therefore, the aforementioned advantages can also be achieved therewith.

Preferably, the surface of the carrier can form an outer surface of the motor vehicle extends such that it is flush with the surface of adjacent components, in particular auto body parts, and/or can at least adjoin flush with the adjacent outer surface of the motor vehicle. For example, to install the carrier on the motor vehicle, slight recesses adapted to the thickness of the carrier can be provided, into which the carrier is inserted, such that the outer surface of the motor vehicle continues at least essentially without height differences. In particular in the case of body parts, an opening can then also be provided in a cavity of the component, wherein the environmental sensor can be inserted in the cavity behind the carrier. In this context, it is also advantageous if, as already mentioned, a switchable layer is present, the color of which in its non-transparent state corresponds to the body color of the motor vehicle. This allows for a particularly appealing exterior design of the motor vehicle, which in particular has no or only few gaps in the exterior. It is also conceivable that the carrier is shaped such that, if a beveled area not provided with light sources is used, a central lamp area provided with the light sources is set back in the manner of a recess, or in other cases also protrudes. This creates a continuous exterior surface that nevertheless emphasizes the lights and makes them recognizable.

BRIEF DESCRIPTION OF THE FIGURES

Further advantages and details of the present invention follow from the exemplary embodiments described below and in reference to the drawings. Therein.

DETAILED DESCRIPTION

Figure 1:
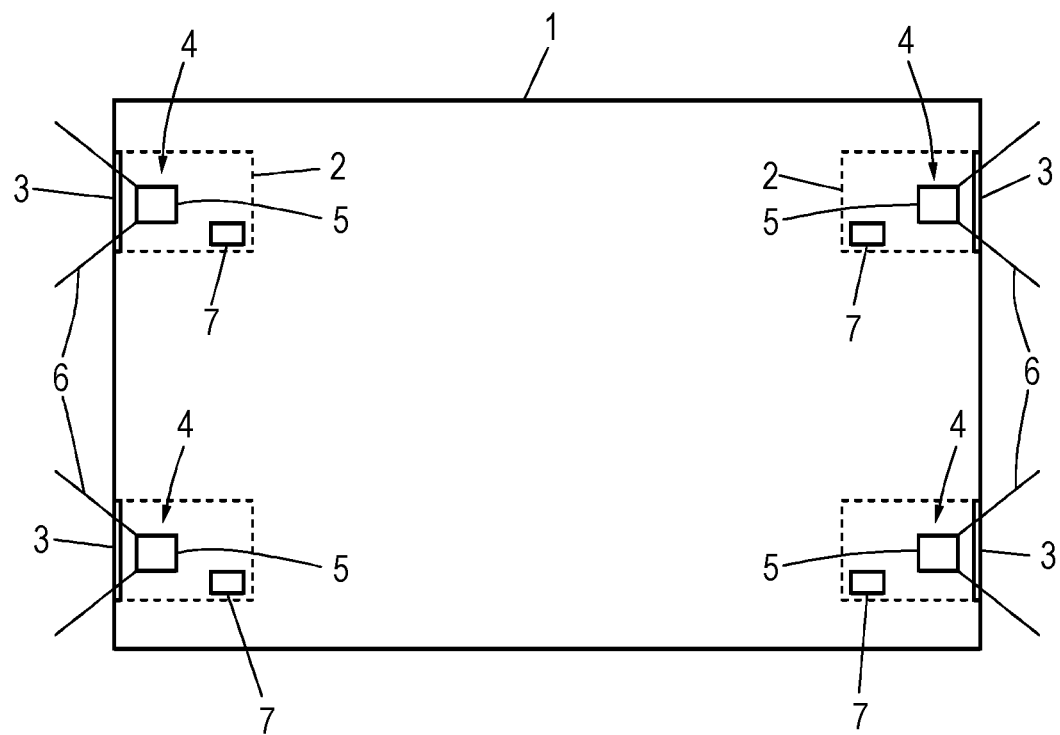
FIG. 1 is a schematic diagram of a motor vehicle according to the invention.

FIG. 1 shows a schematic diagram of a motor vehicle 1 according to the invention. In the present exemplary embodiment, the motor vehicle 1 has three lamp arrangements 2, each of which includes a lamp 3. Each lamp 3 comprises a transparent carrier in which micro-LEDs are embedded as light sources. At least one environmental sensor 4, in the present case cameras 5, is arranged behind each of the transparent carriers of the lamps 3. The cameras 5 capture image data as sensor data through the transparent carrier of the lamp 3, as indicated by the respective detection areas 6. Each lamp arrangement 2 further comprises a control device 7 for its control.

Figure 2:
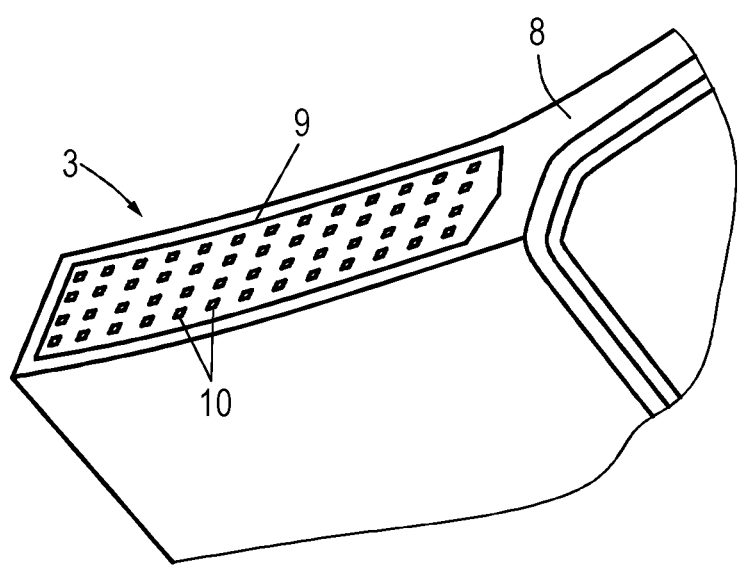
FIG. 2 shows a body part with a lamp arranged on the same.

FIG. 2 shows a perspective view of a body part 8 of the motor vehicle 1, which is arranged in a front section of the motor vehicle 1. The carrier 9 of the lamp 3, which in the present case consists of glass, but can also be made of plastic, is inserted into a recess in the body part 8. Micro-LEDs are embedded as light sources 10 in the carrier 9.

Figure 3:
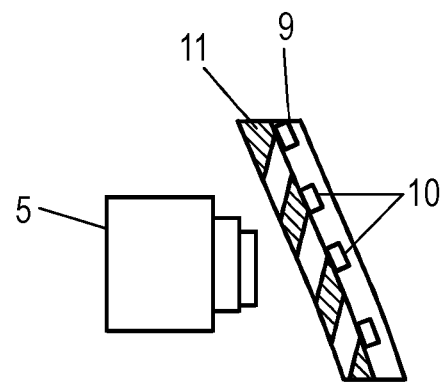
FIG. 3 is a side sectional view in the region of the lamp in FIG. 2.

FIG. 3 shows a partial sectional view through the lamp arrangement 2, in which it can be seen that the camera 5 is arranged behind the carrier 9 with the light sources 10. On the side of the carrier 9 facing the camera 5, a switchable layer 11 is also applied, which, like the light sources 10 and the camera 5, can be controlled by the control device 7. The control device 7, on the one hand, controls the operation of the camera, the switchable layer 11 and the light sources 10, in such a way that the light sources 10 and the camera 5 are always operated alternately, for example each at a frequency of 100 Hz. The camera 5 therefore always records image data when the light sources 10 are currently not being operated. For this to occur, the switchable layer, which can be switched between a transparent and a non-transparent state, must be transparent, which is why it is controlled at the same frequency as the camera 5, in such a way that the switchable layer 11 is always in a transparent state when the camera 5 is in operation. For example, the light sources 10, the camera 5 and the switchable layer 11 can each be operated at a frequency of 100 Hz.

In the non-transparent state of the switchable layer 11, it preferably has an exterior color of the body of the motor vehicle 1. The switchable layer can consist of at least one electrochromic material, for example, and/or be a liquid crystal layer.

Figure 4:
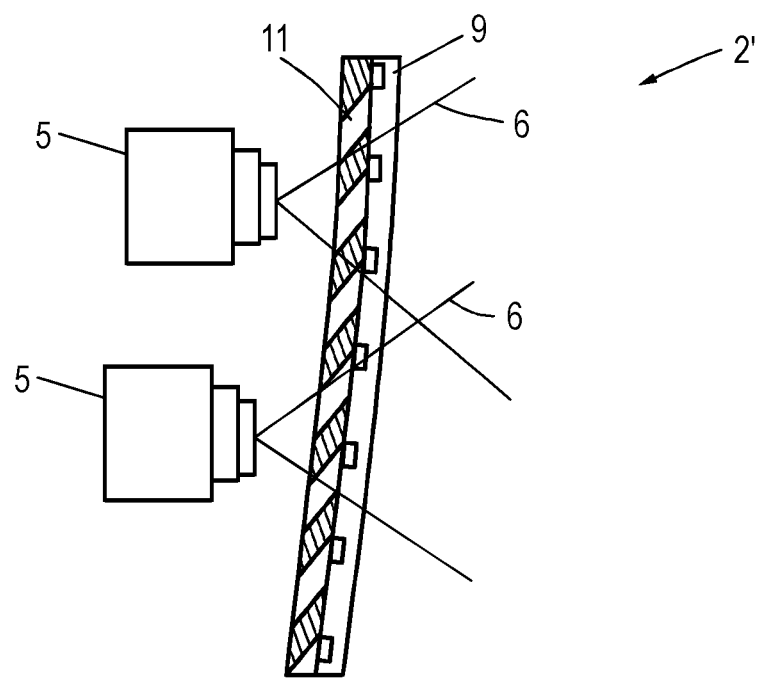
FIG. 4 is a sectional view of another exemplary embodiment of a lamp arrangement according to the invention.

FIG. 4 shows a modified exemplary embodiment of a lamp arrangement 2' according to the invention, in which the light sources 10 in the carrier 9 are not shown for the sake of simplicity. The lamp arrangement 2' has two environmental sensors 4, in the present case again two cameras 5, which are arranged behind the carrier 9 and the switchable layer 11, which is again present. The arrangement of the cameras 5 therein is selected such that the portions in the detection area 6 of one of the cameras 5, which are covered by the light sources 10 in the form of micro-LEDs, are not covered in the detection area 6 of the other camera 5 and are thus detected. In other words, "blind spots" created by the micro-LEDs are avoided.

Figure 5:
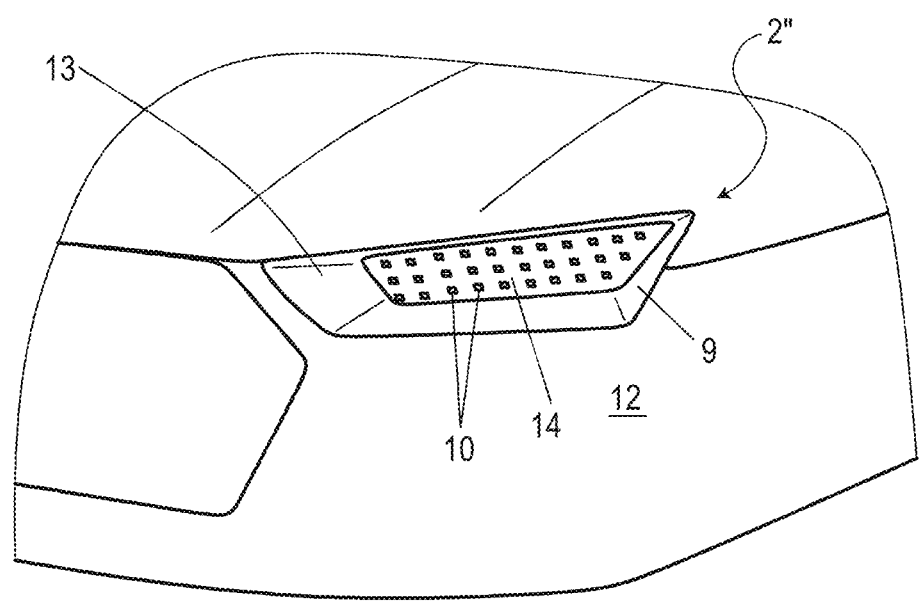
FIG. 5 is a sectional view of an exemplary embodiment with a recessed lighting area.

FIG. 5 shows a third exemplary embodiment of a lamp arrangement 2" according to the invention. In contrast to the design according to FIG. 2, the edge of the carrier 9 also adjoins the remaining outer surface 12 of the motor vehicle 1 in a flush manner here, but an outer area 13 of the carrier 9 not provided with light sources 10 is beveled around a central lamp area 14 in such a way that the lamp area 14 is recessed.

The invention claimed is:

1. A lamp arrangement for a motor vehicle, comprising:
a lamp with a transparent carrier for at least one light source;
a control device;
at least one environmental sensor arranged behind the carrier, which detects sensor data through the carrier; and
a switchable layer, controllable by the control device to switch between a transparent and a non-transparent state, arranged between the carrier and the environmental sensor;
wherein the control device is designed for switching the switchable layer into the transparent state during a detection operation of the environmental sensor.

2. The lamp arrangement according to claim 1, wherein the at least one environmental sensor is one or more of a radar sensor and a camera.

3. The lamp arrangement according to claim 1, wherein the control device is designed for an alternating operation of the environmental sensor and the light sources such that sensor data acquisition occurs during light emission pauses of the light sources.

4. The lamp arrangement according to claim 3, wherein the control device is designed for operating the light sources with a frequency in a range of 25 to 150 Hz.

5. The lamp arrangement according to claim 1, wherein the switchable layer is arranged at an environmental sensor side of the carrier.

6. The lamp arrangement according to claim 1, wherein the control device is designed to switch the switchable layer into the non-transparent state at a time when neither the environmental sensor nor the lamp are operated.

7. The lamp arrangement according to claim 1, wherein the lamp arrangement has multiple environmental sensors arranged behind the carrier.

8. The lamp arrangement according to claim 7, wherein the environmental sensors are arranged such that a detection area of at least one of the environmental sensors includes a partial area covered by a light source for at least one of the other environmental sensors.

9. The lamp arrangement according to claim 1, wherein the light sources are integrated into the transparent carrier.

10. A motor vehicle, having at least one lamp arrangement according to claim 1.

11. The motor vehicle according to claim 10, wherein a surface of the carrier forms an outer surface of the motor vehicle extending such that it is flush with a surface of adjacent components of the motor vehicle.

12. The motor vehicle according to claim 11, wherein a color of the switchable layer, in the non-transparent state, corresponds to a body color of the motor vehicle.

13. The lamp arrangement according to claim 2, wherein the control device is designed for an alternating operation of the environmental sensor and the light sources such that sensor data acquisition occurs during light emission pauses of the light sources.

14. The lamp arrangement according to claim 2, wherein the lamp arrangement has multiple environmental sensors arranged behind the carrier.

15. The lamp arrangement according to claim 3, wherein the lamp arrangement has multiple environmental sensors arranged behind the carrier.

16. The lamp arrangement according to claim 4, wherein the lamp arrangement has multiple environmental sensors arranged behind the carrier.

17. The lamp arrangement according to claim 1, wherein the at least one light source is a micro-LED.

18. The lamp arrangement according to claim 3, wherein the control device is designed for operating the light sources such that operating frequencies of the light sources and the environmental sensor are identical.

19. The motor vehicle according to claim 10, wherein a surface of the carrier forms an outer surface of the motor vehicle extending such that it adjoins an adjacent outer surface of the motor vehicle in a flush manner.

20. The motor vehicle according to claim 11, wherein the adjacent components are auto body parts.

* * * * *